United States Patent
Kamisetti et al.

(10) Patent No.: US 11,388,144 B2
(45) Date of Patent: Jul. 12, 2022

(54) SESSION SETUP IN NETWORK APPLICATIONS

(71) Applicant: NPX USA, Inc., Austin, TX (US)

(72) Inventors: Sai Naidu Kamisetti, Hyderabad (IN); Krishnakumar Venkataraman, Chennai (IN); Sajjan Shakkari, Hyderabad (IN); Karthik Gadepalli, Hyderabad (IN)

(73) Assignee: NXP USA, Inc., Austin, TX (US)

( * ) Notice: Subject to any disclaimer, the term of this patent is extended or adjusted under 35 U.S.C. 154(b) by 248 days.

(21) Appl. No.: 16/940,920

(22) Filed: Jul. 28, 2020

(65) Prior Publication Data

US 2020/0366649 A1 Nov. 19, 2020

Related U.S. Application Data

(62) Division of application No. 15/997,982, filed on Jun. 5, 2018, now Pat. No. 10,764,251.

(51) Int. Cl.
| | | |
|---|---|---|
| *H04L 29/06* | (2006.01) | |
| *H04L 9/40* | (2022.01) | |
| *H04L 67/141* | (2022.01) | |
| *H04L 69/22* | (2022.01) | |

(52) U.S. Cl.
CPC .......... *H04L 63/0263* (2013.01); *H04L 63/10* (2013.01); *H04L 63/1408* (2013.01); *H04L 67/141* (2013.01); *H04L 69/22* (2013.01)

(58) Field of Classification Search
CPC . H04L 63/0263; H04L 63/10; H04L 63/1408; H04L 67/141; H04L 69/22; H04L 63/0254
See application file for complete search history.

(56) References Cited

U.S. PATENT DOCUMENTS

| | | | |
|---|---|---|---|
| 9,942,161 B1* | 4/2018 | Chen | H04L 47/2491 |
| 2016/0330113 A1* | 11/2016 | Chiba | H04L 45/38 |
| 2017/0093914 A1* | 3/2017 | Venkataramanan | H04L 63/101 |
| 2017/0142068 A1* | 5/2017 | Devarajan | H04L 67/146 |
| 2021/0056092 A1* | 2/2021 | Kawatani | G06F 16/958 |

FOREIGN PATENT DOCUMENTS

WO     WO-2018097921 A    *   5/2018           H04L 43/026

\* cited by examiner

*Primary Examiner* — Joseph P Hirl
*Assistant Examiner* — Ka Shan Choy

(57) ABSTRACT

A network security device configured to monitor and control incoming and outgoing network traffic allows for concurrently or parallel access to a network session table by multiple session managers in order to increase the network session setup rate within the device. Each of the multiple session managers can gain access to the session table in parallel with each other when the session managers are processing packets associated with different network sessions. Session managers utilize an identifier unique to each network session to be established in the network session table, which is used to determine which session managers can concurrently access the network session table.

4 Claims, 5 Drawing Sheets

SESSION SETUP IN NETWORK APPLICATIONS

RELATED INVENTION

This application is a Divisional of co-pending, U.S. patent application Ser. No. 15/997,982, filed on 5 Jun. 2018.

TECHNICAL FIELD

The present disclosure relates in general to computer networks, and in particular, to network applications implementing network security systems, such as firewalls and session managers.

BACKGROUND

The Internet is an open (untrusted) network that can be accessed by anyone using primarily a protocol referred to as Transmission Control Protocol/Internet Protocol ("TCP/IP") or other protocols. Because of its openness, computers on private (trusted) networks (e.g., Intranets) are susceptible to malicious attacks by hackers. As a consequence, computer security is a significant concern for computers and computer networks communicating with each other and with the Internet.

Consequently, computer networks employ devices utilizing a network security system to monitor and control incoming and outgoing network traffic based on predetermined security rules, such as implemented within a firewall. A firewall can be generalized as a set of logical functions mainly related to security that are implemented on a box in a computer network. In general, a firewall establishes a barrier between a trusted internal network and an untrusted external network, such as the Internet. Firewalls are typically categorized as network-based or host-based. Network-based firewalls may be positioned on the edge devices (e.g., gateway computers) of local area networks ("LANs"), wide area networks ("WANs"), and Intranets. Host-based firewalls (or some other security protocol, such as Network Address Translation ("NAT") or Internet Protocol Security ("IPsec")) may be positioned on a network node device itself and control network traffic in and out of those machines.

A host-based firewall may be a daemon or service as a part of the operating system or an agent application such as endpoint security or protection. They may be either software appliances running on general-purpose hardware, or hardware-based firewall computer appliances. The firewall may run on a dedicated electronic device, as a set of functions that complement other functions on a device such as a router, as a set of functions on a server, laptop, or workstation, or on some other network device. Thus, in general, a firewall may be implemented in any type of device that runs software developed specifically to separate an internal network from an external network and to protect the former from the latter, or vice versa.

The firewall's job is to inspect each packet attempting to enter or leave the local network. Generally, a packet is a formatted unit of data carried by a packet-switched network. This examination, referred to as packet filtering, is made to determine whether the packet will be allowed into or out of the network. Packet filtering is generally based on access control lists.

Network layer firewalls operate at a relatively low level of a TCP/IP protocol stack, not allowing packets to pass through the firewall unless they match the established rule set. The firewall administrator may define the rules; or default rules may apply. Network layer firewalls generally fall into two sub-categories, stateful and stateless. Stateful firewalls maintain context about active network sessions and use that "state information" to speed up packet processing.

A network session (also simply referred to herein as a "session") is a semi-permanent interactive information interexchange between devices communicating over a network (e.g., TCP connections or UDP streams). Any existing network session can be described by several properties, including source and destination IP addresses, UDP or TCP ports, and the current stage of the connection's lifetime (including connection initiation, handshaking, data transfer, or completion connection). If a packet does not match an existing network session, it will be evaluated according to the ruleset for new connections. If a packet matches an existing session based on comparison with the firewall's state table, it will be allowed to pass for further processing.

Often, when a network session begins, a firewall is called into play to analyze the initial packets. The analysis may yield a decision about whether or not to permit the session to be created in light of predetermined security policies. If a decision is reached, then the header values common to all packets of the session may be stored in memory (e.g., a session table) together with the decision. In this way, it is not necessary for the firewall access control rules to be called over and over for every subsequent packet of a session. Rather, a packet header key, or some other unique identifier, may be sought in the session table, and if found, a stored action or decision enforced.

In certain scenarios, it may be important to be able to create a session at a high rate (e.g., to cater to the occurrence of burst traffic) without losing data of any connection. The challenges faced are a need to support a high degree of parallelism while processing and updating the session table, maintaining data integrity when the session table is being updated in parallel by multiple processes/tasks, providing exclusive access to the session table when a session with the same unique identifier is being updated by multiple processes, and to maintain a high session setup rate.

DETAILED DESCRIPTION

Figure 1:
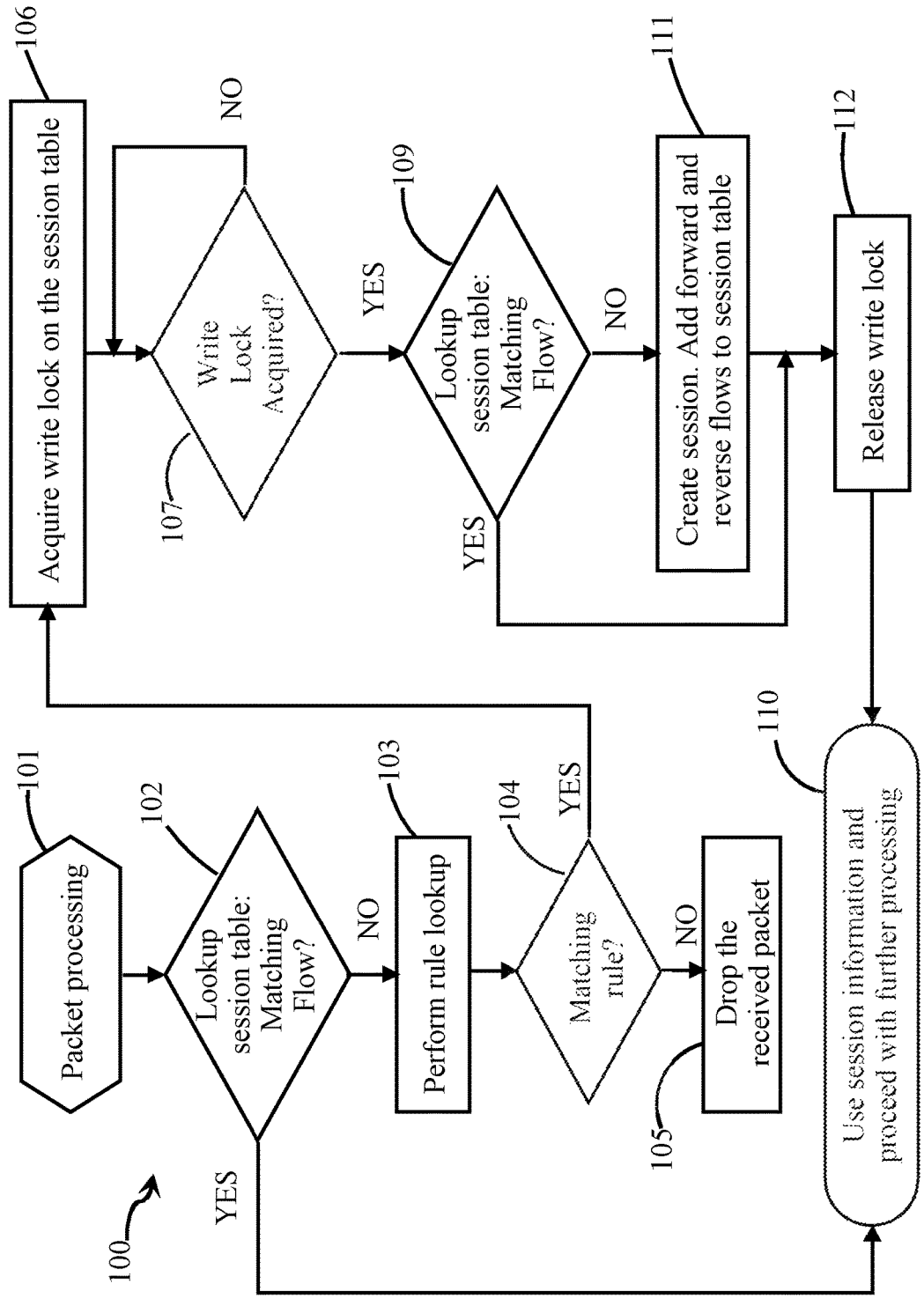
FIG. 1 illustrates a flowchart diagram of a prior art process for packet processing within a network security system.

Aspects of the present disclosure pertain to improving the network session setup rate in network applications implementing network security systems, such as firewalls and session managers operating at the Layer 3 network layer. A unique identifier is generated based on the content of a received packet and then utilized by session managers to create a new network session. Each of a multiple of session managers can gain access to the session table in parallel (concurrently) with each other when the session managers are processing packets associated with different network sessions. Session managers utilize the unique identifier to determine which session managers can concurrently access the network session table. As a result, aspects of the present disclosure increase the possibility of accessing such a network session table in parallel and thereby improving the connection setup rate for new network sessions.

Within the following description, aspects of the present disclosure are described relative to utilization of a network security system implemented as a firewall. However, the present disclosure is not limited to implementations within a device utilizing firewall software. Embodiments of the present disclosure may also be implemented within any device utilizing any type of software/hardware configured to monitor and control incoming and outgoing traffic between networks, or between a network and a computing device coupled to a network, based on predetermined security rules (e.g., Network Address Translation ("NAT"), Internet Protocol Security ("IPsec")).

Within a firewall, intensive processor time may be consumed at the time of setup of a network session (herein also referred to as simply a "session"). Entries are created for sessions that satisfy a defined security policy. This occurs during receipt and processing of the first packet of a session, and the created sessions are stored in a session table (which may be implemented as a cache memory). A session sets up a communication channel between two devices over a network. A session typically includes two flows, one each for the forward and reverse directions. A forward flow represents the transmission of packets from one of the devices to the other, while a reverse flow represents the communication of packets from the second device back to the first. Incoming packets processed by a firewall will pertain to one of these two flows. Since the source and destination IP addresses associated with each of these flows are different, when a session is created within the session table, the session table will include entries for both of the forward and reverse flows pertaining to the session. This allows the session manager to process packets associated with both of the forward and reverse flows pertaining to the session.

After a session has been set up, all subsequently received packets for that session are processed rapidly because it is simple and fast to determine whether it belongs to an existing, pre-screened session. Consequently, packets associated with these created sessions are permitted to pass through the firewall. Packets are dropped that do not match any previously created session and there is no matching policy in the rule set for handling the packets.

Referring to FIG. 1, there is illustrated a prior art process 100 for creation of a session by a firewall for the processing of a first packet of a given session. In step 101, the firewall begins processing of an incoming packet. In step 101, a session manager may perform IP header validations, transport header validations, and check for any possible malformed packets. In step 102, the session manager performs a lookup in a session table to determine if the packet is associated with an already existing session established by the firewall. Such a lookup in the session table may be performed by the session manager utilizing various values from the header of the packet. If the session manager determines that the packet is associated with an already existing session set up (created) within the session table, the session manager will proceed to step 110 to use the session information from the session table to proceed with further processing of the packet in accordance with that session flow.

However, if the packet is not associated with an already existing session, then the session manager will proceed to step 103 to perform a rule lookup within a firewall access control. The firewall access control will determine in step 104 if there is a rule within an access control list ("ACL") rules database that applies to information associated with the packet. An ACL, with respect to a computer file system, is a list of permissions attached to an object. An ACL specifies which users or system processes are granted access to objects, as well as what operations are allowed on given objects. Each entry in a typical ACL specifies a subject and an operation. With respect to the routing of data over a network, access control lists may serve several purposes, most notably in filtering network traffic as described herein and securing critical network resources. However, the addition of access control lists increases packet latency due to the overhead of extra computations involved. For example, network devices check packets against an ACL, defined by a network administrator, which specifies which types of network traffic should be permitted and which type should be denied.

If the firewall access control determines there is not a rule within an ACL rules database that applies to information associated with the packet, then the session manager will drop the received packet in step 105. However, if there is a matching ACL rule, then the session manager will proceed to step 106 and acquire a write lock on the entire session table. The process 100 will loop in step 107 until a write lock on the session table is acquired. In step 109, the session manager will again perform a lookup within the session table to determine if the packet is associated with an entry within the session table.

If there is a matching session within the session table, the session manager proceeds to step 112, releases the write lock, and then proceeds to step 110 to use that session information for further processing of the packet. However, if there is no matching session within the session table, the session manager will proceed to step 111 to create a new session and add forward and reverse flows to the session table with information derived from the incoming packet. In step 112, the write lock on the session table will be released by the session manager, and the session manager will proceed to step 110 to use the newly created session for further processing of the packet.

The reason that a write lock is necessary is because only one entry into the session table may be added at any particular time, because there could be a plurality of sessions being processed by the firewall in parallel. As a result, the session lookup in step 109 is performed after the session manager has acquired a write lock on the session table. The session lookup in step 109 may be performed to determine if a session belonging to the packet being processed by the session manager has been created while the session manager has been waiting for the write lock in step 107.

The write lock avoids the creation of duplicate entries within the session table. For example, if two different processor cores within the firewall are each processing incoming packets having the same header information (e.g., the same 5-tuple values), both such session managers operating within these two different processor cores may determine that there is no matching session flows at step 102, and thus both such session managers may proceed with processing of these two different packets through the process 100 up to step 107. If each such session manager does not perform the write lock in steps 106-107, then each such session manager may proceed with the operations by steps 109 and 111, which could result in both of the session managers creating duplicate entries within the session table (e.g., using the same 5-tuple information from the two separate packets). However, as a result of the implementation within each of the session managers of steps 106-107, the first session manager acquiring the write lock on the session table will be able to proceed through steps 109 and 111 to thereby create the forward and reverse session flows within the session table while the other processor core implementing its own session manager waits for the release of the write lock in step 112 by the other processor core implementing its session manager. Thus, as can be seen in FIG. 1, each such session manager has to wait at the step 107 until it is able to acquire a write lock on the entire session table.

In the process 100, the session table is common for all the flows of sessions and needs to be protected while the flows of the sessions are being updated within it (e.g., by a plurality of processor cores). In order to achieve this, each processor core's session manager acquires a write lock on the entire session table while updating the flows of a given session. Note that the write lock on the entire session table may diminish the parallel processing capability of the firewall (e.g., by a plurality of processor cores handling received packets). When one process holds the write lock, the number of parallel processes that can acquire the lock are zero. This may adversely affect the session setup rate, i.e., the number of network connections that can be concurrently set up (i.e., established within the session table). In contrast, embodiments of the present disclosure increase the possibility of accessing the session table in parallel and thereby improve the connection setup rate.

Figure 2:
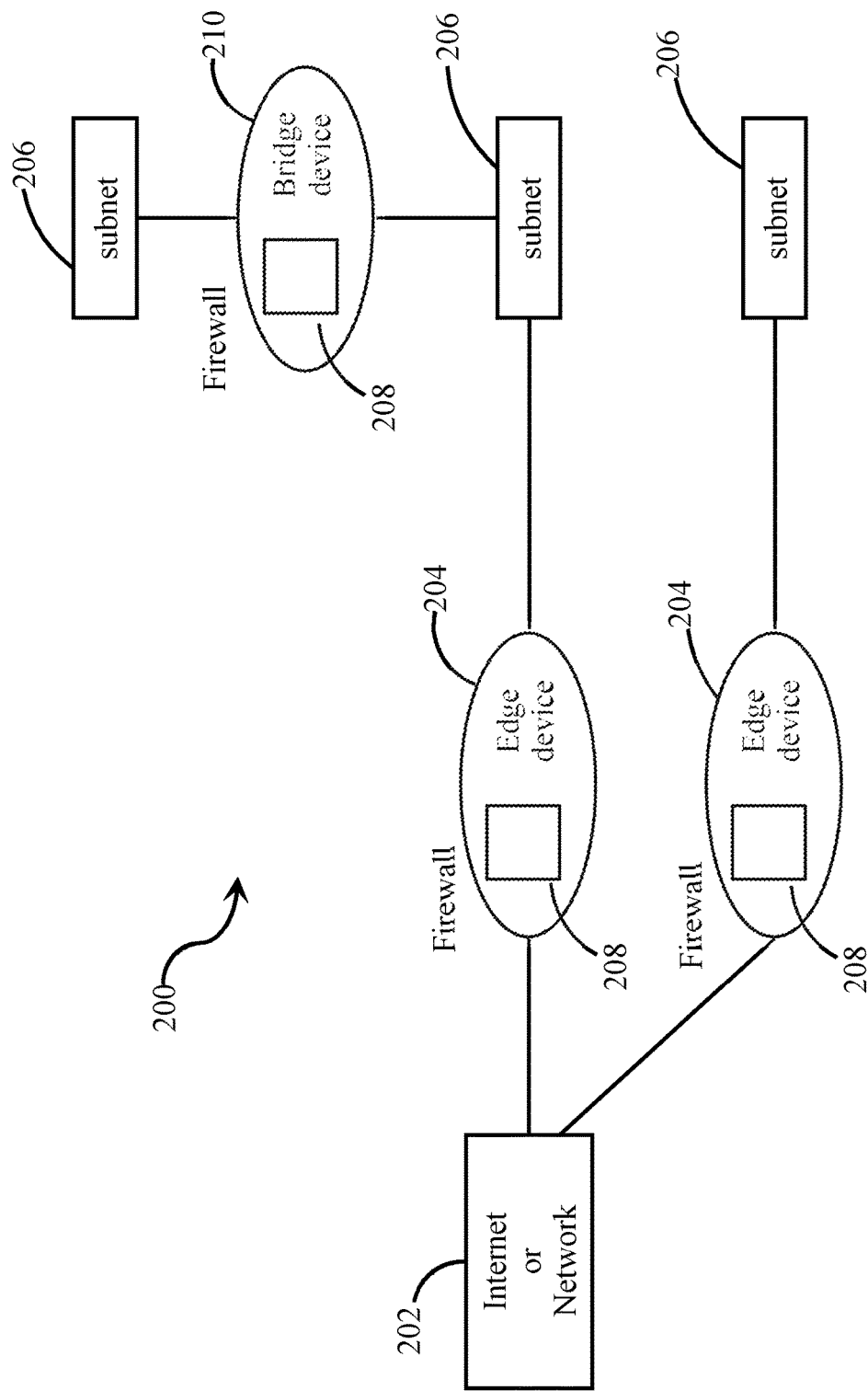
FIG. 2 illustrates a high level block diagram of an exemplary network, and in particular, some potential logical locations in which a network security system may be positioned within various network connections.

Referring to FIG. 2, there is illustrated a non-limiting exemplary network 200 in which embodiments of the present disclosure may be implemented within any one or more of the firewalls 208. The Internet or other network 202 (e.g., a LAN or WAN) connects to one or more edge devices 204. The edge devices 204 may be implemented as gateway computers or devices, or may be any data processing system (e.g., see FIG. 5) configured to determine whether to allow received packets from a network to be forwarded to another network, or further processed by a computing device. Each edge device 204 may or may not contain an instance of a firewall 208. One or more firewalls 208 may be implemented with one or more processor cores each configured to individually process incoming packets in accordance with various embodiments of the present disclosure. Alternatively, a single processor core may be logically partitioned wherein each logical partition is configured to individually process incoming packets in accordance with various embodiments of the present disclosure.

The edge devices 204 may also connect to one or more subnets 206. In turn, two subnets 206 may be connected by a bridge device 210. A bridge device 210 may or may not contain an instance of a firewall 208 configured in accordance with embodiments of the present disclosure. Any one of the subnets 206 may include one or more computing devices (e.g., a user's computer) or a LAN, which may include a wireless network. Because such edge devices, subnets, and bridge devices are well-known in the art, further discussion of these entities will not be provided herein.

Figure 3:
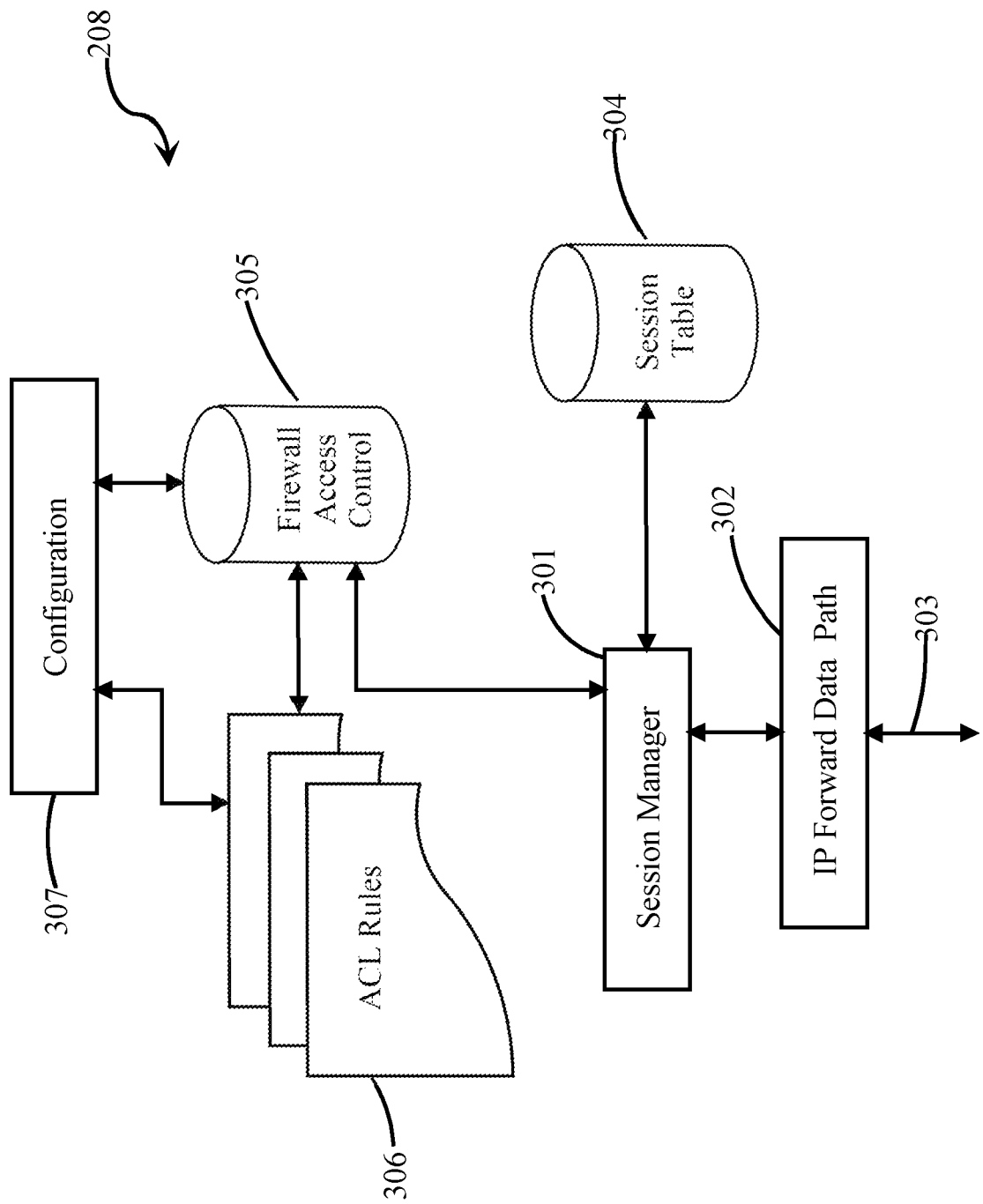
FIG. 3 illustrates a block diagram of an exemplary network security system configured in accordance with embodiments of the present disclosure.

Referring next to FIG. 3, there is illustrated relative components of a firewall 208 configured in accordance with embodiments of the present disclosure. An IP forward data path 302 couples the firewall 208 via a transmission path 303 to components within an edge device 204, and ultimately provides one or more paths for the receipt and transmission of packets to/from the firewall 208. A session manager 301 (e.g., an IPv4/IPv6 session manager) performs operations in accordance with the firewall 208. If the firewall 208 is configured with more than one processor core, then one or more of such processor cores may be configured with its own session manager 301, each of which may be configured to perform the various operations as described herein with respect to FIG. 4. The session manager 301 may be implemented within a stateful firewall. A stateful firewall keeps track of the state of network sessions and is able to hold significant attributes of each session in memory (e.g., the session table 304). These attributes are collectively known as the state of the connection (i.e., session), and may include such details as the IP addresses and ports involved in the session and the sequence numbers of the packets traversing the connection established by the session. Stateful inspection monitors incoming and outgoing packets over time, as well as the state of the session, and stores the data in dynamic state tables (e.g., the session table 304). Only packets matching a known active session are allowed to pass through the firewall.

As will be further described herein, a session manager 301 interacts with the session table 304 to determine if an incoming packet is already associated with an existing session, and also sets up new sessions within the session table 304. A session manager 301 also interacts with a firewall access control 305 to perform a rule lookup within the access control list ("ACL") rules 306 when an incoming packet is determined to not be associated with an already existing session. A configuration interface 307 may also be provided for programming and updating of the ACL rules 306. In accordance with embodiments of the present disclosure, a firewall 208 may be implemented with a single session table 304 commonly accessible by one or more session managers 301 operating within one or more processor cores.

Figure 4:
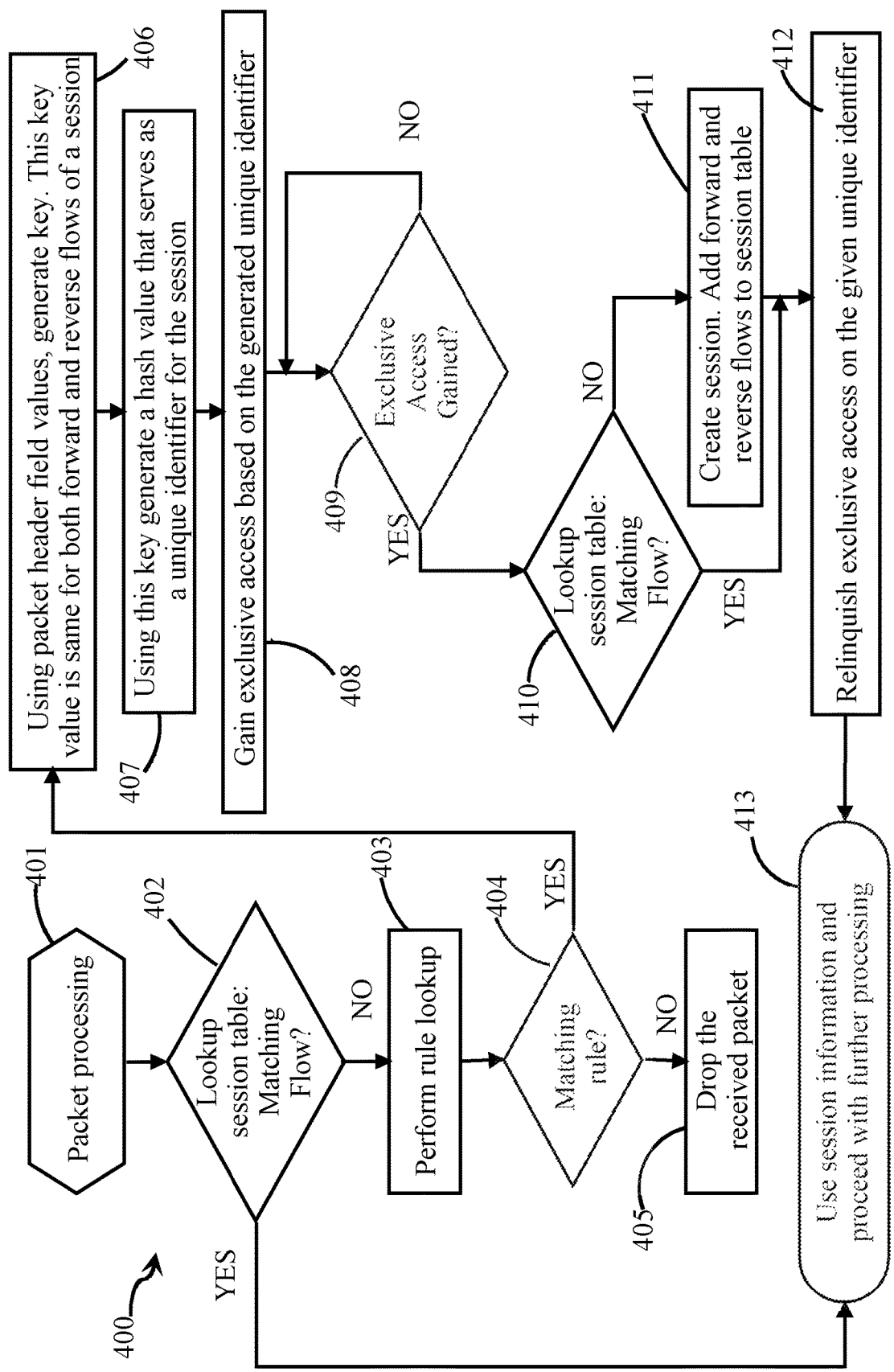
FIG. 4 illustrates a flowchart diagram of a system and method for packet processing configured in accordance with embodiments of the present disclosure.

Referring to FIG. 4, there is illustrated a system and method 400 configured in accordance with embodiments of the present disclosure. As previously noted, in certain scenarios, it is important to be able to create a new session at a high rate to cater to occurrences of burst traffic without losing packets within any particular connection enabled by the network device employing a firewall. The system and method 400 is configured to support a high degree of parallelism within the network device while processing and updating the session table 304, maintain data integrity when the session table 304 is being updated in parallel by multiple processes/tasks, provide exclusive access to the session table 304 when a session with the same unique identifier is being updated by multiple processes, and maintain a high session setup rate.

In accordance with embodiments of the present disclosure as illustrated in FIG. 4, a session manager 301 of the firewall 208 may be configured to derive a unique identifier based on the content of the packet. The session manager 301 then utilizes this unique identifier to maintain data integrity within the session table 304.

In the process block 401, the firewall 208 begins processing of an incoming packet (for example, a packet arriving at a port of a network device (e.g., an edge device 204, a bridge device 210, or a node device) from a source IP address. In the process block 401, the session manager 301 may perform IP header validations, transport header validations, and check for any possible malformed packets. In the process block 402, the session manager 301 performs a lookup in the session table 304 to determine if the packet is associated with an already existing session established by the firewall 208. In accordance with certain embodiments of the present disclosure, such header values may be what are referred to as the 5-tuple components. 5-tuple refers to a set of five different values that are utilized within a TCP/IP connection, which includes a source IP address/port number, destination IP address/port number, and the protocol in use.

If the session manager 301 determines that the packet is associated with an already existing session set up within the session table 304, the session manager 301 will proceed to the process block 413 to use the session information from the session table 304 and proceed with further processing of the packet in accordance with that session flow (for example, transferring the packet to another port of the network device (e.g., an edge device 204, a bridge device 210, or a node device) to be forwarded to the destination IP address identified within the network session). However, if the packet is not associated with an already existing session, then the session manager 301 will proceed to the process block 403 to perform a rule lookup within the firewall access control 305. The firewall access control 305 will determine in the process block 404 if there is a rule within the ACL rules database 306 that applies to information associated with the packet. If there is not a rule within the ACL rules database 306 that applies to information associated with the packet, then the session manager 301 will drop the received packet in the process block 405. However, if there is a matching rule within the ACL rules database 306 that applies to information associated with the packet, then the session manager 301 will proceed to the process block 406.

In the process block 406, the session manager 301 may use predetermined packet header field values to generate a key, whereby this key will be the same for both forward and reverse flows of a session established by the session manager 301 for this first packet. For example, the value of the key may be created with parameters that include the source IP address, identification of the source port, the destination IP address, identification of the destination port, and/or the protocol of the received packet. For example, the key may be formed by concatenating the source IP address, destination IP address, source port, destination port, and protocol fields of the received packet. However, note that embodiments of the present disclosure may utilize other parameters from the packet header field values, or the overall packet in general, for creating this key.

In the process block 407, the session manager 301 may then utilize this key to generate a hash value (e.g., a 32-bit value) that will serve as a unique identifier for the session. The hash function may be created as a predetermined mathematical function applied to the key. In general, a hash function is any function that can be used to map data of arbitrary size to data of fixed size. The values returned by a hash function may be referred to as hash values, hash codes, digests, or simply hashes. In accordance with embodiments of the present disclosure, hash values may be generated from the keys in order to accelerate lookups in the session table 304 (e.g., for detecting duplicated sessions in the session table 304).

In the process block 408, the session manager 301 will attempt to gain exclusive access to the session table 304 based on the generated unique identifier. The system and method 400 will only allow access to the session table 304 for each unique identifier at a time. Thus, if there are multiple processor cores (or multiple logical partitions in a single processor core) in the firewall 208 each processing packets with their respective session managers 301, and these multiple session managers 301 are each attempting to gain access to the session table 304 with identical unique identifiers, only one of the session managers 301 will be granted such exclusive access to the session table 304 in the process block 409; any other such session manager(s) will be required to wait until the session manager 301 that gained exclusive access relinquishes such exclusive access to the session table 304 in the process block 412. For example, two different session managers 301, in certain instances, may be processing different packets received by the firewall 208 that are intended to be associated with the same session to be created and processed by the firewall 208. For example, the firewall 208 may begin receiving packets to be associated with a network session to be established, and thus may be receiving multiple packets from the same remote source or the same host computer coupled to the firewall 208. In such instances, the firewall 208 may have more than one processor core processing such packets in parallel. Therefore, as the session managers 301 within these processor cores process their respective packets through the process blocks 401-407, the session managers 301 will end up generating identical unique identifiers for their respective packets.

The process block 409 is configured so that only one of these session managers 301 is allowed to proceed to the process block 410, while the other session manager(s) 301 will be required to wait until the session manager 301 that gained exclusive access to the session table 304 has completed the process blocks 410 . . . 412. This prevents multiple session managers 301 from accessing the session table 304 at the same time in order to process packets associated with the same session to be created by the session managers 301. In accordance with embodiments of the present disclosure, well-known hardware/software may be utilized to implement the process block 409 to ensure that only one of the multiple session managers 301 is able to obtain exclusive access to the session table 304 per each unique identifier. In a non-limiting example, a spinlock on the other session manager(s) 301 not having exclusive access to the session table 304 may be utilized to implement the process block 409 for such a purpose (for example, by an operating system executing within a data processing system in which the firewall is implemented (e.g., see FIG. 5)). In general, a spinlock is a lock which causes a thread trying to acquire a resource, such as a particular memory address, to simply wait in a loop ("spin") while repeatedly checking if the lock is available, which can be achieved via atomic set operations to a specific memory variable or address (atomicity is often enforced by mutual exclusion, whether at the hardware level building on a cache coherency protocol, or the software level using semaphores or locks). In another non-limiting example, the process block 409 may be implemented by a memory controller managing the session table 304 utilizing any well-known write or file blocking software for granting and denying access to the session table 304.

If multiple session managers 301 are processing packets associated with different network sessions, then these session managers 301 will end up generating unique identifiers in the process block 407 that are different from each other. In such instances, each of these session managers 301 will be provided access to the session table 304 by the process block 409 in parallel with each other. As a result, the entire session table 304 is not required to be locked, as previously described with respect to FIG. 1, thus allowing multiple session managers 301 operating within multiple processor cores (or within multiple logical partitions in a single processor core) to continue processing their respective packets through the process blocks 410 . . . 412. The previously disclosed techniques for denying access to the session table 304 (e.g., a spinlock, or write, or file, blocking software) may be utilized to grant such multiple session managers 301 access to the session table 304.

In the process block 410, the session manager 301 gaining exclusive access to the session table 304 per its unique identifier performs a lookup into the session table 304 to determine whether there is a session already established pertaining to this associated unique identifier. The session lookup in the process block 410 may be performed to determine if a session pertaining to the packet had been created while the session manager 301 was waiting for the exclusive access in the process block 409. If there is a matching session, then the session manager 301 proceeds to the process block 412 to relinquish the exclusive access on the unique identifier, and then further proceeds to the process block 413 to use the existing session information within the session table 304 for further processing of the packet. If there is no matching session in the session table 304, the session manager 301 proceeds to the process block 411 to create a new session and add information pertaining to the new session (e.g., the forward and reverse flows of the session) to the session table 304. Thereafter, in the process block 412, the session manager 301 relinquishes the exclusive access to the session table 304 for the given unique identifier that was created. The system and method 400 then proceeds to the process block 413 to use the newly created session for further processing of the packet.

Note that in accordance with certain embodiments of the present disclosure, implementation of the process block 407 may be optional. In such embodiments in which the process block 407 is not implemented, the key generated by the process block 406 may be utilized as the unique identifier.

Figure 5:
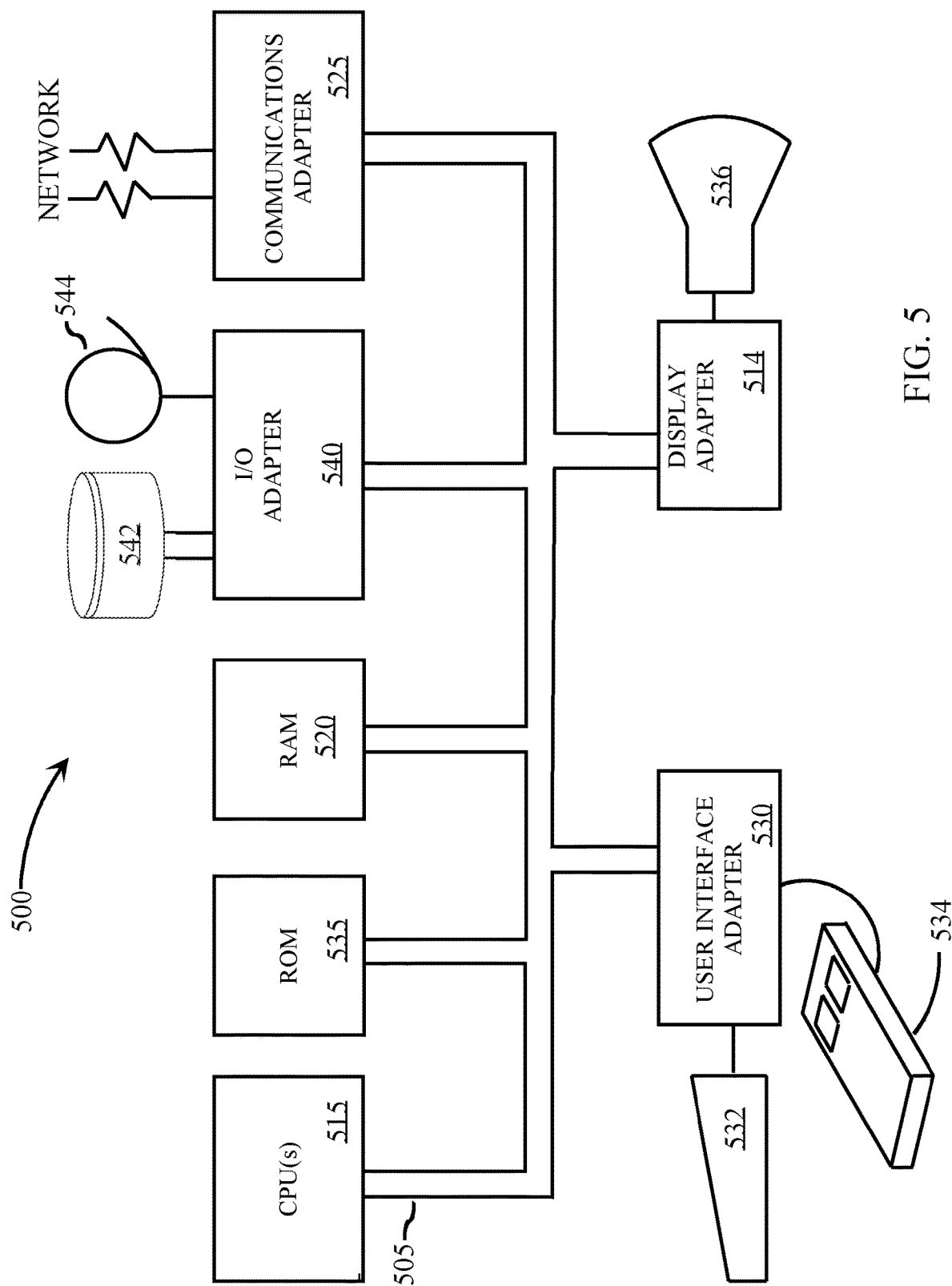
FIG. 5 illustrates a data processing system configured in accordance with embodiments of the present disclosure.

With reference now to FIG. 5, a block diagram of a data processing system 500 is depicted in which aspects of embodiments of the present disclosure may be implemented. The data processing system 500 is disclosed herein to present a non-limiting example of a network security system implementing a firewall 208. Embodiments of the present disclosure are not to be limited to implementation within a system as particularly illustrated within FIG. 5. (Note that the terms "data processing system," "computer," "system," "computer system," and "network security system" may be interchangeably used herein.)

The data processing system 500 may employ a local bus (e.g., a peripheral component interconnect ("PCI") local bus architecture). Other bus architectures, such as Accelerated Graphics Port ("AGP") and Industry Standard Architecture ("ISA"), may be used, among others. One or more processor cores ("CPU(s)") 515, a volatile memory ("RAM") 520, and/or a non-volatile memory 535 ("ROM") may be coupled to the local bus 505 (e.g., through a PCI Bridge (not shown)). Such a PCI Bridge also may include an integrated memory controller (not shown) and cache memory (not shown) for the processor core(s) 515. Additional connections to the local bus 505 may be made through direct component interconnection or through add-in boards. In the depicted example, a network communication adapter 525 (configured to couple the system 500 to a LAN, such as a subnet 206, or a WAN, such as the Internet 202), a small computer system interface ("SCSI") host bus adapter (not shown), and/or expansion bus interface (not shown) may be coupled to the local bus 505. An audio adapter (not shown), graphics adapter (not shown), and/or audio/display adapter 514 may be coupled to the local bus 505. The audio/display adapter 514 may be coupled to a display device 536, which may implement a touch screen display.

An interface (not shown) may be implemented to provide a connection for a user interface adapter 530, which may be coupled to various I/O devices, such as a keyboard 532 and/or mouse 534, a modem (not shown), and/or additional memory (not shown). A host bus I/O adapter 540 may be implemented to provide a connection for a hard disk drive 542, tape drive 544, or CD-ROM drive (not shown).

An operating system may be run on the processor core(s) 515 and used to coordinate and provide control of various components within the data processing system 500 (e.g., operation of a network security system as described herein); the operating system may be a commercially available operating system. An object-oriented programming system, such as Java, may run in conjunction with the operating system and provide calls to the operating system from Java programs or programs (e.g., one or more session managers 301) executing on the data processing system 500. Instructions for the operating system, the object-oriented operating system, or application programs (e.g., one or more session managers 301) may be stored in the non-volatile memory 535, which may be configured as a solid state memory or a hard disk drive, and may be loaded into the volatile memory 520 for execution by the processor core(s) 515.

Those of ordinary skill in the art will appreciate that the hardware in FIG. 5 may vary depending on the implementation. Other internal hardware or peripheral devices, such as a flash ROM (or equivalent nonvolatile memory) or optical disk drives and the like, may be used in addition to or in place of the hardware depicted in FIG. 5.

In accordance with certain aspects of the present disclosure, the data processing system 500 may be configured as a stand-alone system configured to be bootable without relying on some type of network communication. In accordance with certain aspects of the present disclosure, the data processing system 500 may be an embedded controller, which may be configured with a ROM (e.g., the ROM 535) or a flash ROM providing non-volatile memory storing operating system files, one or more application programs, and/or user-generated data.

The depicted embodiments in FIG. 5 and previously disclosed embodiments described with respect to FIGS. 2-4 are not meant to imply architectural limitations. Further, a computer program configured in accordance with embodiments of the present disclosure may reside on any computer readable storage medium (for example, a floppy disk, a compact disk, a hard disk (e.g., the hard drive 542), a tape drive 544, solid state memory (e.g., the ROM 535, the RAM 520, etc.)) used by a computer system.

As will be appreciated by one skilled in the art, aspects of the present disclosure may be embodied as a system, method, or program product. Accordingly, aspects of the present disclosure may take the form of an entirely hardware embodiment, an entirely software embodiment (including firmware, resident software, micro-code, etc.), or embodiments combining software and hardware aspects, which may all generally be referred to herein as a "circuit," "circuitry," "module," or "system," configured to perform various operations and function disclosed herein. Furthermore, aspects of the present disclosure may take the form of a computer program product embodied in one or more computer readable storage medium(s) having computer readable program code embodied thereon. (However, any combination of one or more computer readable medium(s) may be utilized. The computer readable medium may be a computer readable signal medium or a computer readable storage medium.)

A computer readable storage medium may be, for example, but not limited to, an electronic, magnetic, optical, electromagnetic, infrared, biologic, atomic, or semiconductor system, apparatus, controller, or device, or any suitable combination of the foregoing. More specific examples (a non-exhaustive list) of the computer readable storage medium may include the following: an electrical connection having one or more wires, a portable computer diskette, a hard disk (e.g., the hard drive 542), a random access memory (e.g., the RAM 520), a read-only memory (e.g., the ROM 535), an erasable programmable read-only memory ("EPROM" or Flash memory), an optical fiber, a portable compact disc read-only memory ("CD-ROM"), an optical storage device, a magnetic storage device, or any suitable combination of the foregoing. In accordance with aspects of the present disclosure, a computer readable storage medium may be any tangible medium that can contain or store a program or software instructions for use by or in connection with an instruction execution system, apparatus, processor, controller (e.g., microcontroller), or device. Program code embodied on a computer readable signal medium may be transmitted using any appropriate medium, including but not limited to wireless, wire line, optical fiber cable, RF, etc., or any suitable combination of the foregoing.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, processor, controller (e.g., microcontroller), or device.

The flowchart diagram and block diagrams in the figures illustrate architectures, functionalities, and operations of possible implementations of systems, methods, and program products configured in accordance with various embodiments of the present disclosure. In this regard, each block in the flowchart or block diagrams may represent circuitry, a circuit, a module, a segment, or a portion of code that includes one or more executable program instructions for implementing the specified logical function(s). It should also be noted that, in some implementations, the functions noted in the blocks may occur out of the order noted in the figures. For example, two blocks shown in succession may, in fact, be executed substantially concurrently, or the blocks may sometimes be executed in a reverse order, depending upon the functionality involved. Furthermore, various ones of the process blocks of FIG. 4 may be performed concurrently by a plurality of processor cores (or a plurality of logical partitions within a single processor core).

These program instructions may be provided to a microprocessor or microcontroller of a general purpose computer, special purpose computer or device, or other programmable data processing apparatus to produce a machine, such that the instructions, which execute via the microprocessor or microcontroller of the computer, or device, other programmable data processing apparatus, create means for implementing the functions/acts specified in the flowchart or block diagram block or blocks.

It will also be noted that each block of the block diagrams or flowchart diagram illustration, and combinations of blocks in the block diagrams or flowchart diagram illustration can be implemented by special purpose hardware-based systems that perform the specified functions or acts, or combinations of special purpose hardware and computer instructions. For example, a module (e.g., an IP module) may be implemented as a hardware circuit including custom VLSI circuits or gate arrays, off-the-shelf semiconductors such as logic chips, transistors, controllers, or other discrete components. A module (e.g., an IP module) may also be implemented in programmable hardware devices such as field programmable gate arrays, programmable array logic, programmable logic devices, or the like.

Computer program code, i.e., instructions, for carrying out operations for aspects of the present disclosure (such as the process blocks of the system and method 400) may be written in any combination of one or more programming languages, including, but not limited to, an object-oriented programming language such as Java, Smalltalk, C++, or the like, and conventional procedural programming languages, such as the "C" programming language or similar programming languages.

These program instructions may also be stored in a computer readable storage medium that can direct a data processing system (e.g., the system 500), other programmable data processing apparatus, microprocessor, processor core(s), microcontroller, or other devices to function in a particular manner, such that the instructions stored in the computer readable medium produce an article of manufacture including instructions that implement the functions/acts specified in the flowchart or block diagram block or blocks, or functions represented or exemplified within the schematic diagrams.

The program instructions may also be loaded onto a data processing system (e.g., the system 500), other programmable data processing apparatus, microprocessor, processor core(s), microcontroller, or other devices to cause a series of operational steps to be performed, so as to produce a computer-implemented process such that the instructions that execute on the data processing system, other programmable data processing apparatus, microprocessor, processor core(s), microcontroller, or other devices provide processes for implementing the functions/acts specified in the flowchart or block diagram block or blocks, or functions represented or exemplified within the schematic diagrams.

One or more databases may be included in the system for storing and providing access to data for the various implementations (e.g., for implementing the firewall access control 305 or the session table 304). One skilled in the art will also appreciate that, for security reasons, any databases, systems, or components of the present disclosure may include any combination of databases or components at a single location or at multiple locations, wherein each database or system may include any of various suitable security features, such as firewalls, access codes, encryption, de-encryption and the like. The database may be any type of database, such as relational, hierarchical, object-oriented, or the like. The database (e.g., for implementing the firewall access control 305 or the session table 304) may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, or the like.

Aspects of the present disclosure provide a data processing system that includes circuitry configured to receive a first packet from a network coupled to the data processing system, a first session manager configured to generate a first unique identifier to be associated with a first network session, wherein the first unique identifier is generated from header values of the first packet, circuitry configured to receive a second packet from the network, a second session manager configured to generate a second unique identifier to be associated with a second network session, wherein the second unique identifier is generated from header values of the second packet, circuitry configured to grant the first session manager access to a session table based on the first unique identifier, and circuitry configured to grant the second session manager access to the session table based on the second unique identifier, wherein the first and second session managers are concurrently granted access to the session table. In accordance with aspects of the present disclosure, the data processing system may further include circuitry configured to create the first and second network sessions in the session table. In accordance with aspects of the present disclosure, the first and second network sessions are concurrently created in the session table. In accordance with aspects of the present disclosure, the data processing system may further include circuitry configured to receive a third packet from the network, a third session manager configured to generate a third unique identifier to be associated with the first network session, wherein the third unique identifier is generated from header values of the third packet and the third unique identifier is identical to the first unique identifier, and circuitry configured to deny the third session manager access to the session table while the first session manager has access to the session table. In accordance with aspects of the present disclosure, the data processing system may further include circuitry configured to grant the third session manager access to the session table after the first session manager has relinquished its access to the session table. In accordance with aspects of the present disclosure, the data processing system may further include circuitry configured to forward the third packet to another network coupled to the data processing system based on the third session manager determining that the third packet is associated with the first network session previously created in the session table by the first session manager. In accordance with aspects of the present disclosure, the data processing system may further include the third session manager configured to process the third packet based on the first network session previously created in the session table by the first session manager. In accordance with aspects of the present disclosure, the first, second, and third session managers are implemented within a firewall. In accordance with aspects of the present disclosure, the first, second, and third session managers are implemented within a network address translator. In accordance with aspects of the present disclosure, the first, second, and third session managers are implemented by a network protocol suite utilizing Internet Protocol Security. In accordance with aspects of the present disclosure, the data processing system is an edge device coupled between an untrusted network and a trusted network. In accordance with aspects of the present disclosure, the first unique identifier is a first hash value generated from a first key that is based on the header values of the first packet, wherein the second unique identifier is a second hash value generated from a first key that is based on the header values of the second packet.

Aspects of the present disclosure provide a data processing system that includes a plurality of session managers configured to process packets received from one or more networks coupled to the data processing system, a session table configured to establish a plurality of network sessions that the plurality of session managers utilize to determine whether to further process or drop the packets received from the one or more networks, the plurality of session managers each configured to create a unique identifier associated with a received packet when the received packet does not pertain to a network session already established within the session table, circuitry configured to grant exclusive access to the session table to only one of two or more of the plurality of session managers that are attempting to concurrently access the session table with identical unique identifiers, and circuitry configured to grant concurrent access to the session table to a plurality of the session managers that are attempting to concurrently access the session table with different unique identifiers. In accordance with aspects of the present disclosure, the data processing system may further include circuitry configured to enable the plurality of the session managers that are attempting to concurrently access the session table with different unique identifiers to concurrently create a plurality of different network sessions in the session table. In accordance with aspects of the present disclosure, the plurality of session managers are each executed by a plurality of processor cores. In accordance with aspects of the present disclosure, the plurality of session managers are implemented within a firewall, wherein the plurality of network sessions are established to control transfers of packets between pluralities of networks coupled to the data processing system.

Aspects of the present disclosure provide a process performed in a device configured to monitor and control incoming and outgoing network traffic, wherein the process includes determining whether a session table contains a network session pertaining to a first packet received by the device, determining whether an access control list contains an access control rule for processing of the first packet when it is determined that the session table does not contain a network session pertaining to the first packet, creating a first unique identifier associated with the first packet if it is determined that the access control list contains an access control rule for processing of the first packet, and adding a first network session to the session table associated with the first packet while not permitting any other packet associated with the first unique identifier to be processed by a session manager until after the network session has been added to the session table. In accordance with aspects of the present disclosure, the creating of the unique identifier includes generating a key from header field values of the first packet, and generating a hash value of the key to create the first unique identifier to be associated with the network session. In accordance with aspects of the present disclosure, the process may further include creating a second unique identifier associated with a second packet received by the device, adding a second network session to the session table associated with the second packet, wherein session managers adding the first and second network sessions to the session table are granted concurrent access to the session table for adding their respective network sessions to the session table. In accordance with aspects of the present disclosure, network sessions in the session table instruct the device as to whether to permit transfers of packets pertaining to the network sessions between networks coupled to the device.

Reference may be made herein to a device, software module (e.g., session manager, session table), or circuitry "configured to" perform a particular function or functions. It should be understood that this may include selecting predefined logic blocks and logically associating them, such that they provide particular logic functions, which includes monitoring or control functions. It may also include programming computer software-based logic, wiring discrete hardware components, or a combination of any or all of the foregoing.

Reference throughout this specification to "an embodiment," "embodiments," "certain embodiments," "various embodiments," or similar language means that a particular feature, structure, or characteristic described in connection with the embodiments is included in at least one embodiment of the present disclosure. Thus, appearances of the phrases "in embodiments," "in an embodiment," "embodiments," and similar language throughout this specification may, but do not necessarily, all refer to the same embodiment. Furthermore, the described features, structures, aspects, or characteristics of the disclosure may be combined in any suitable manner in one or more embodiments. Correspondingly, even if features may be initially claimed as acting in certain combinations, one or more features from a claimed combination can in some cases be excised from the combination, and the claimed combination can be directed to a sub-combination or variation of a sub-combination.

The terminology used herein is for the purpose of describing particular embodiments only and is not intended to be limiting of the disclosure. In the descriptions herein, numerous specific details are provided, such as examples of programming, software modules, user selections, network transactions, database queries, database structures, hardware modules, hardware circuits, hardware chips, controllers, etc., to provide a thorough understanding of embodiments of the disclosure. One skilled in the relevant art will recognize, however, that the disclosure may be practiced without one or more of the specific details, or with other methods, components, materials, signals, and so forth. In other instances, well-known structures, materials, or operations may be not shown or described in detail to avoid obscuring aspects of the disclosure.

Benefits, advantages, and solutions to problems may have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims.

Headings used herein are not intended to limit the disclosure, embodiments of the disclosure, or other matter disclosed under the headings. As used herein, the singular forms "a," "an," and "the" may be intended to include the plural forms as well, unless the context clearly indicates otherwise. Herein, the term "or" may be intended to be inclusive, wherein "A or B" includes A or B and also includes both A and B. As used herein, the term "or" when used in the context of a listing of entities, refers to the entities being present singly or in combination. Thus, for example, the phrase "A, B, C, or D" includes A, B, C, and D individually, but also includes any and all combinations and subcombinations of A, B, C, and D. As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

The corresponding structures, materials, acts, and equivalents of all means or step plus function elements in the claims below may be intended to include any structure, material, or act for performing the function in combination with other claimed elements as specifically claimed.

What is claimed is:

1. A process performed in a device configured to monitor and control incoming and outgoing network traffic, the process comprising:
   determining whether a session table contains a network session pertaining to a first packet received by the device;
   determining whether an access control list contains an access control rule for processing of the first packet when it is determined that the session table does not contain a network session pertaining to the first packet;
   creating a first unique identifier associated with the first packet in response to determining that the access control list contains an access control rule for processing of the first packet; and
   adding a first network session to the session table associated with the first packet while not permitting any other packet associated with the first unique identifier to be processed by a session manager until after the network session has been added to the session table.

2. The process as recited in claim 1, wherein the creating of the unique identifier comprises:
   generating a key from header field values of the first packet; and
   generating a hash value of the key to create the first unique identifier to be associated with the network session.

3. The process as recited in claim 1, further comprising:
   creating a second unique identifier associated with a second packet received by the device; and
   adding a second network session to the session table associated with the second packet, wherein session managers adding the first and second network sessions to the session table are granted concurrent access to the session table for adding their respective network sessions to the session table.

4. The process as recited in claim 3, wherein network sessions in the session table are configured to instruct the device as to whether to permit transfers of packets pertaining to the network sessions between networks coupled to the device.

* * * * *